(12) United States Patent
Holmberg

(10) Patent No.: US 7,780,363 B1
(45) Date of Patent: Aug. 24, 2010

(54) DEVICE FOR MOUNTING IMAGING EQUIPMENT TO A BOW AND METHOD OF RECORDING A HUNT

(76) Inventor: Larry Holmberg, 901 Cottonwood Dr., Harrisburg, SD (US) 57032

( * ) Notice: Subject to any disclaimer, the term of this patent is extended or adjusted under 35 U.S.C. 154(b) by 436 days.

(21) Appl. No.: 12/015,881

(22) Filed: Jan. 17, 2008

(51) Int. Cl.
*G03B 17/00* (2006.01)
*F41B 5/00* (2006.01)
*F41G 1/00* (2006.01)

(52) U.S. Cl. .................. 396/426; 396/421; 124/88; 33/265

(58) Field of Classification Search .............. 396/426, 396/425, 421; 124/123.1, 83–91; 33/265
See application file for complete search history.

(56) References Cited

U.S. PATENT DOCUMENTS

| | | |
|---|---|---|
| 521,761 A | 6/1894 | Day |
| 547,912 A | 10/1895 | Crupe |
| 619,214 A | 2/1899 | Paul |
| 674,229 A | 5/1901 | Windle |
| 845,165 A | 2/1907 | Davis |
| 899,639 A | 9/1908 | Vibber |
| 1,452,651 A | 4/1923 | Norrlin |
| 1,480,147 A | 1/1924 | Brandt |
| 2,101,479 A | 12/1937 | Schenk |
| 2,450,466 A | 10/1948 | Carlson |
| 2,814,118 A | 11/1957 | Evans et al. |
| 3,427,102 A | 2/1969 | Wade |
| 3,483,623 A | 12/1969 | Kruzell |
| 3,684,376 A | 8/1972 | Lessard |
| 3,684,378 A | 8/1972 | Lord |
| 3,737,232 A | 6/1973 | Millburn, Jr. |
| 3,782,822 A | 1/1974 | Spence |
| 3,785,261 A | 1/1974 | Ganteaume |
| 3,834,052 A | 9/1974 | Steck, III |

(Continued)

FOREIGN PATENT DOCUMENTS

EP 1804017 A1 7/2007

(Continued)

OTHER PUBLICATIONS

Improved Construction Methods, "Laser Measuring System, Impulse LX", http://www.improvedconstructionmethods.com/impulse_xl.htm.

(Continued)

*Primary Examiner*—Rochelle-Ann J Blackman
(74) *Attorney, Agent, or Firm*—Kinney & Lange, P.A.

(57) ABSTRACT

A device for operably mounting a camera to a bow. The device includes a guideway, a mounting bracket assembly, a biasing system, an attachment mechanism for securing a camera to the mounting bracket assembly and an attachment mechanism for securing the mounting bracket to a bow. A traveler on the mounting bracket assembly operably engages the guideway for movement along the longitudinal length of the guideway. The mounting bracket assembly includes a shelf, suitable for supporting a camera, attached to the traveler by a transversely extending strut. The biasing system is operable for longitudinally biasing the mounting bracket assembly away from both longitudinal ends of the guideway into a rest position intermediate the longitudinal ends of the guideway, thereby damping any recoil effect experienced by the camera caused by release of an arrow from the bow.

20 Claims, 4 Drawing Sheets

U.S. PATENT DOCUMENTS

| | | |
|---|---|---|
| 4,000,403 A | 12/1976 | Rice |
| 4,026,054 A | 5/1977 | Snyder |
| 4,027,414 A | 6/1977 | Felix |
| 4,069,414 A | 1/1978 | Bell |
| 4,223,770 A | 9/1980 | Kranz |
| 4,283,743 A | 8/1981 | Kaiser |
| T101,001 I4 | 9/1981 | Shipp et al. |
| 4,296,725 A | 10/1981 | Broderick |
| D268,910 S | 5/1983 | Shipp et al. |
| 4,514,907 A | 5/1985 | Saltzman |
| 4,516,296 A | 5/1985 | Sherman |
| 4,531,052 A | 7/1985 | Moore |
| 4,561,204 A | 12/1985 | Binion |
| 4,564,322 A | 1/1986 | Stapley |
| 4,597,211 A | 7/1986 | Miles |
| 4,606,629 A | 8/1986 | Hines et al. |
| 4,617,741 A | 10/1986 | Bordeaux et al. |
| 4,640,258 A | 2/1987 | Penney et al. |
| 4,643,159 A | 2/1987 | Ryan |
| 4,730,190 A | 3/1988 | Win et al. |
| 4,753,528 A | 6/1988 | Hines et al. |
| 4,777,352 A | 10/1988 | Moore |
| 4,786,204 A | 11/1988 | Mayeda |
| 4,786,966 A | 11/1988 | Hanson et al. |
| 4,827,348 A | 5/1989 | Ernest et al. |
| 4,835,621 A | 5/1989 | Black |
| 4,884,137 A | 11/1989 | Hanson et al. |
| 4,890,128 A | 12/1989 | Kania |
| 4,910,717 A | 3/1990 | Terry |
| 4,939,863 A | 7/1990 | Alexander et al. |
| 4,970,589 A | 11/1990 | Hanson et al. |
| 4,974,575 A | 12/1990 | Mitchell |
| D313,361 S | 1/1991 | Robinson |
| 4,993,833 A | 2/1991 | Lorey et al. |
| 4,996,866 A | 3/1991 | Masera et al. |
| 5,005,213 A | 4/1991 | Hanson et al. |
| 5,020,262 A | 6/1991 | Pena |
| 5,026,158 A | 6/1991 | Golubic |
| 5,033,219 A | 7/1991 | Johnson et al. |
| 5,161,310 A | 11/1992 | Stoot |
| 5,200,827 A | 4/1993 | Hanson et al. |
| 5,262,837 A | 11/1993 | Shyy |
| 5,265,896 A | 11/1993 | Kravitz |
| 5,297,533 A | 3/1994 | Cook |
| 5,326,061 A | 7/1994 | Hamilton |
| 5,339,793 A | 8/1994 | Findley |
| 5,373,657 A | 12/1994 | Betz et al. |
| 5,418,609 A | 5/1995 | Dunne |
| 5,455,625 A | 10/1995 | Englander |
| 5,456,157 A | 10/1995 | Lougheed et al. |
| 5,479,712 A | 1/1996 | Hargrove et al. |
| 5,507,272 A | 4/1996 | Scantlen |
| 5,520,164 A | 5/1996 | Huddleston |
| D371,084 S | 6/1996 | Ogawa |
| 5,531,149 A | 7/1996 | Schubert et al. |
| 5,555,665 A | 9/1996 | Fore |
| 5,575,072 A | 11/1996 | Eldridge |
| 5,606,818 A | 3/1997 | Hardee |
| 5,611,324 A | 3/1997 | Kursinsky |
| 5,669,147 A | 9/1997 | Nakajima et al. |
| 5,669,174 A | 9/1997 | Teetzel |
| 5,686,690 A | 11/1997 | Lougheed et al. |
| 5,687,910 A | 11/1997 | King |
| 5,711,104 A | 1/1998 | Schmitz |
| D390,483 S | 2/1998 | Zykan et al. |
| 5,739,859 A | 4/1998 | Hattori et al. |
| 5,815,251 A | 9/1998 | Ehbets et al. |
| 5,822,621 A | 10/1998 | Szajewski |
| 5,831,718 A | 11/1998 | Desai et al. |
| 5,834,676 A | 11/1998 | Elliott |
| 5,845,165 A | 12/1998 | McMahan |
| 5,859,693 A | 1/1999 | Dunne et al. |
| 5,887,375 A | 3/1999 | Watson |
| 5,892,617 A | 4/1999 | Wallace |
| 5,895,131 A | 4/1999 | Yano |
| 5,911,215 A | 6/1999 | Fisher, Jr. |
| 5,926,260 A | 7/1999 | Dunne et al. |
| 5,937,562 A | 8/1999 | Brough |
| 5,944,041 A | 8/1999 | Kitchens |
| 5,949,529 A | 9/1999 | Dunne et al. |
| 5,964,054 A | 10/1999 | Galfidi, Jr. |
| 5,973,315 A | 10/1999 | Saldana et al. |
| D421,229 S | 2/2000 | Imai |
| 6,029,643 A | 2/2000 | Golfieri |
| 6,070,355 A | 6/2000 | Day |
| 6,073,352 A | 6/2000 | Zykan et al. |
| D432,930 S | 10/2000 | Sanoner |
| 6,137,564 A | 10/2000 | Schmidt et al. |
| 6,154,971 A | 12/2000 | Perkins |
| 6,192,614 B1 | 2/2001 | Cliburn |
| 6,252,706 B1 | 6/2001 | Kaladgew |
| 6,269,581 B1 | 8/2001 | Groh |
| 6,286,796 B1 | 9/2001 | Pugliesi |
| 6,288,386 B1 | 9/2001 | Bowen et al. |
| 6,296,581 B1 | 10/2001 | Sever |
| 6,304,289 B1 | 10/2001 | Sakai et al. |
| 6,331,887 B1 | 12/2001 | Shiraishi et al. |
| 6,336,285 B1 | 1/2002 | Baumer |
| 6,341,201 B1 | 1/2002 | Ishiguro et al. |
| 6,396,571 B2 | 5/2002 | Ohtomo et al. |
| 6,397,483 B1 | 6/2002 | Perkins |
| 6,398,571 B1 | 6/2002 | Nishide et al. |
| 6,408,140 B1 | 6/2002 | Malloy Desormeaux |
| D460,367 S | 7/2002 | Apotheloz et al. |
| D460,368 S | 7/2002 | Apotheloz et al. |
| D460,369 S | 7/2002 | Apotheloz et al. |
| 6,425,697 B1 | 7/2002 | Potts et al. |
| 6,450,816 B1 | 9/2002 | Gerber |
| 6,487,809 B1 | 12/2002 | Gaber |
| 6,494,196 B2 | 12/2002 | Harwath et al. |
| 6,526,956 B1 | 3/2003 | Hankins |
| D472,826 S | 4/2003 | Sanoner |
| 6,556,245 B1 | 4/2003 | Holmberg |
| 6,598,331 B1 | 7/2003 | Thibodeaux |
| 6,615,531 B1 | 9/2003 | Holmberg |
| 6,623,182 B2 | 9/2003 | Tatera |
| 6,624,881 B2 | 9/2003 | Waibel et al. |
| 6,678,988 B1 | 1/2004 | Poff, Jr. |
| 6,681,755 B2 | 1/2004 | Pujos |
| 6,693,702 B2 | 2/2004 | Rogers |
| 6,704,097 B2 | 3/2004 | Waibel et al. |
| D488,315 S | 4/2004 | Natuzzi |
| 6,722,076 B2 | 4/2004 | Nielsen |
| 6,742,299 B2 | 6/2004 | Strand |
| 6,772,076 B2 | 8/2004 | Yamamoto et al. |
| 6,784,920 B2 | 8/2004 | Weber |
| 6,796,038 B2 | 9/2004 | Humphries |
| 6,813,025 B2 | 11/2004 | Edwards |
| 6,815,251 B1 | 11/2004 | Akram et al. |
| 6,819,495 B2 | 11/2004 | Shani et al. |
| 6,819,866 B2 | 11/2004 | Da Silva |
| 6,886,288 B1 | 5/2005 | Yocum et al. |
| 6,932,305 B2 | 8/2005 | Morales et al. |
| 6,988,331 B2 | 1/2006 | Holmberg |
| 7,006,144 B2 | 2/2006 | Holmberg |
| 7,088,506 B2 | 8/2006 | Regan et al. |
| 7,128,354 B2 | 10/2006 | Wu |
| 7,269,920 B2 | 9/2007 | Staley, III |
| 7,390,130 B2 | 6/2008 | Soulvie |
| 2002/0067475 A1 | 6/2002 | Waibel et al. |
| 2002/0078577 A1 | 6/2002 | Aldred |
| 2002/0087475 A1 | 7/2002 | Okayama et al. |
| 2002/0109057 A1 | 8/2002 | Wooten et al. |
| 2002/0171755 A1 | 11/2002 | Nishimura |

| | | |
|---|---|---|
| 2003/0013392 A1 | 1/2003 | Guillermin |
| 2003/0133092 A1 | 7/2003 | Rogers |
| 2003/0163943 A1 | 9/2003 | Holmberg |
| 2004/0000083 A1 | 1/2004 | Grant, Jr. |
| 2004/0016169 A1 | 1/2004 | Poff, Jr. |
| 2004/0051865 A1 | 3/2004 | Stierle et al. |
| 2004/0079018 A1 | 4/2004 | Holmberg |
| 2004/0114129 A1 | 6/2004 | Gogolla et al. |
| 2004/0135991 A1 | 7/2004 | Gogolla et al. |
| 2004/0183942 A1 | 9/2004 | Holmberg |
| 2004/0194364 A1 | 10/2004 | Holmberg |
| 2004/0257437 A1 | 12/2004 | Lesseu |
| 2005/0035245 A1 | 2/2005 | Morales et al. |
| 2005/0123883 A1 | 6/2005 | Kennen et al. |
| 2005/0195385 A1 | 9/2005 | Holmberg |
| 2005/0241210 A1 | 11/2005 | Karcher et al. |
| 2005/0246910 A1 | 11/2005 | Mowers |
| 2005/0252062 A1 | 11/2005 | Scrogin et al. |
| 2005/0268519 A1 | 12/2005 | Pikielny |
| 2005/0268521 A1 | 12/2005 | Cox et al. |
| 2006/0010761 A1 | 1/2006 | Staley, III |
| 2006/0215149 A1 | 9/2006 | LaBelle et al. |
| 2007/0008187 A1 | 1/2007 | Schmidt |
| 2007/0031142 A1 | 2/2007 | Moody et al. |
| 2007/0068018 A1 | 3/2007 | Gilmore |
| 2007/0081817 A1 | 4/2007 | Soulvie |
| 2007/0157502 A1 | 7/2007 | Holmberg |
| 2007/0157503 A1 | 7/2007 | Holmberg |
| 2007/0277421 A1 | 12/2007 | Perkins et al. |
| 2008/0000465 A1 | 1/2008 | Holmberg |
| 2008/0060248 A1 | 3/2008 | Pine et al. |

FOREIGN PATENT DOCUMENTS

| | | |
|---|---|---|
| GB | 2024558 A | 1/1980 |
| GB | 2114770 A | 8/1983 |
| WO | WO9012330 | 10/1990 |
| WO | 2006090356 A1 | 8/2006 |
| WO | WO2006090356 A1 | 8/2006 |
| WO | 2006133029 A2 | 12/2006 |
| WO | WO2006133029 A2 | 12/2006 |

OTHER PUBLICATIONS

"Specification Sheet on the Impulse 200 LR Laser (Rangefinder)," Nov. 15, 2003, Publisher: Laser Technology Inc.

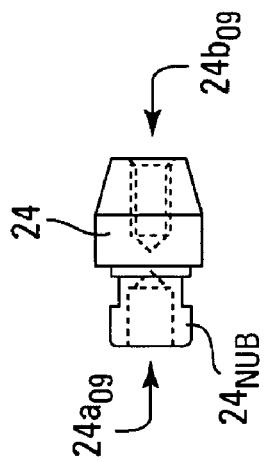
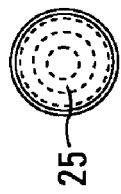
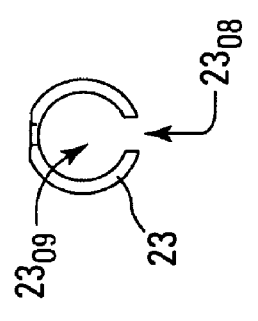
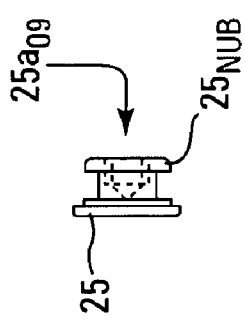
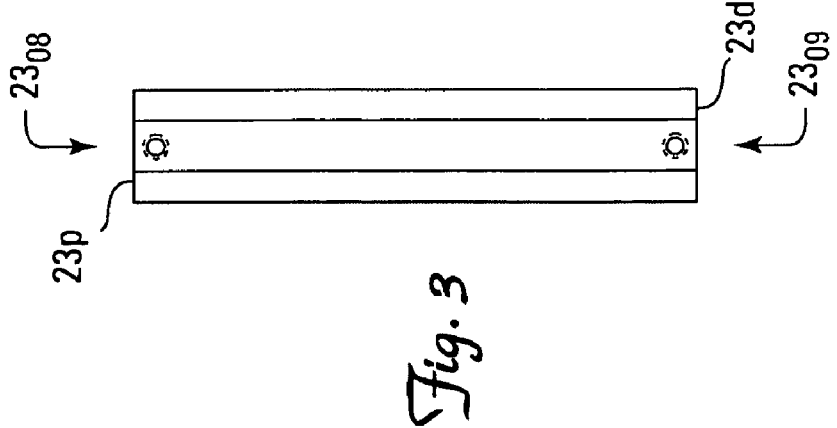

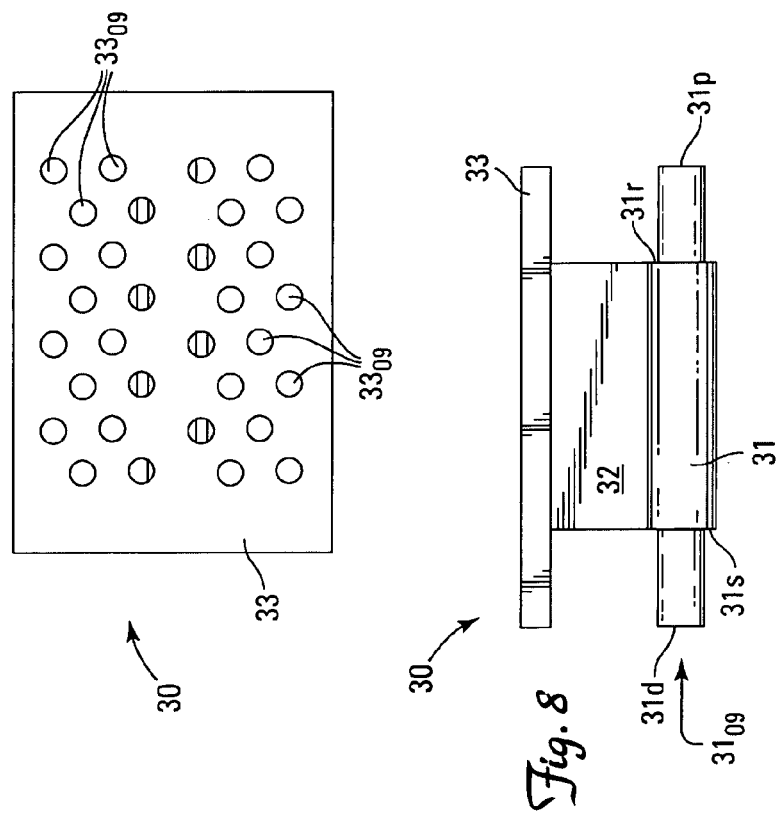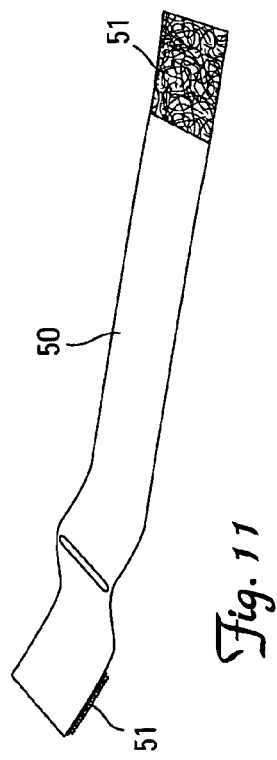

DEVICE FOR MOUNTING IMAGING EQUIPMENT TO A BOW AND METHOD OF RECORDING A HUNT

BACKGROUND

Bow hunters often desire to record a hunt, especially that moment in time when the bow is raised in preparation for a shot, a shot is launched at the target and the target reacts to the shot.

Generally, a hunter does not have sufficient time or space to both aim and fire a camera and aim and fire a bow once a target is spotted, especially since targets tend to move frequently between the time the target is spotted and the time a shot is fired at the target.

A number of devices have been developed for mounting a camera to a bow whereby aiming the bow at a target inherently results in aiming the camera at the target. Exemplary mounting devices are described in U.S. Pat. Nos. 4,296,725, 4,643,159, 4,890,128, 5,611,324 and 6,556,245, and United States Patent Application Publication 2005/0246910.

While generally effective for allowing the recording of a hunt, such mounts are not configured and arranged to accommodate the mounting of standard cameras, do not properly dampen the recoil effect experienced upon release of an arrow from the bow—resulting in a temporary "blinding" of the camera at a critical point in the hunt, are expensive and/or difficult to use.

Accordingly, a need exists for an inexpensive device capable of allowing quick and easy vibrational dampened mounting of a standard camera onto a bow.

SUMMARY OF THE INVENTION

A first aspect of the invention is a device for operably mounting a camera to a bow. The device includes a guideway, a mounting bracket assembly, a biasing system, and an attachment mechanism for securing a camera to the device. The guideway extends in the longitudinal direction, with the proximal longitudinal end configured and arranged for attachment to a bow. The mounting bracket assembly includes at least a traveler, a strut and a shelf. The traveler operably engages the guideway for movement along the longitudinal length of the guideway. The strut extends transversely from the traveler. The shelf is attached to the distal end of the strut, whereby the shelf is transversely spaced from the traveler. The biasing system is operable for longitudinally biasing the mounting bracket assembly away from both longitudinal ends of the guideway, whereby the mounting bracket assembly is biased into a rest position intermediate the longitudinal ends of the guideway.

A second aspect of the invention is a method for recording images of a hunt using the first aspect of the invention. Briefly, the method includes the steps of (1) obtaining a bow defining a median plane, (2) obtaining a camera, (3) obtaining the mounting device described in the preceding paragraph, (4) attaching the mounting device to the bow via an internally threaded stablilizer bore in the front of the bow such that the mounting device extends longitudinally forward from the bow and is laterally divided by the median plane defined by the bow, (5) activating the camera to start recording images, and (6) firing an arrow from the bow towards a target while the camera is activated.

BRIEF DESCRIPTION OF THE DRAWINGS

FIG. 3 is a top view of the tubular component of the housing subunit of the invention shown in FIGS. 1 and 2.

FIG. 4 is an end view of the tubular component of the housing subunit of the invention shown in FIG. 3.

FIG. 5 is a side view of the proximal end endcap component of the housing subunit of the invention shown in FIGS. 1 and 2.

FIG. 6 is a side view of the distal end endcap component of the housing subunit of the invention shown in FIGS. 1 and 2.

FIG. 7 is an end view of the distal end endcap component of the housing subunit of the invention shown in FIG. 6.

FIG. 8 is a side view of the mounting bracket subunit of the invention shown in FIGS. 1 and 2.

FIG. 9 is a top view of the mounting bracket subunit of the invention shown in FIG. 8.

FIG. 10 is an end view of the mounting bracket subunit of the invention shown in FIG. 8.

FIG. 11 is a perspective view of the optional securement strap shown in phantom in FIG. 2.

DETAILED DESCRIPTION OF THE INVENTION INCLUDING A BEST MODE

Nomenclature

| | |
|---|---|
| B | Bow |
| $B_{09}$ | Internally Threaded Stabilizer Bore in Front of Bow |
| C | Camera |
| $C_{09}$ | Internally Threaded Bore in Camera |
| 10 | Mounting Device |
| 20 | Guideway |
| 20p | Proximal Longitudinal End of Guideway |
| 20d | Distal Longitudinal End of Guideway |
| 21 | Rod |
| 21p | Proximal Longitudinal End of Rod |
| 21d | Distal Longitudinal End of Rod |
| 22 | Housing Unit (Tube and Endcaps) |
| 23 | Tube |
| 23p | Proximal Longitudinal End of Tube |
| 23d | Distal Longitudinal End of Tube |
| $23_{08}$ | Longitudinal Slit in Tube |
| $23_{09}$ | Longitudinal Bore Through Tube |
| 24 | First Endcap |
| $24_{Nub}$ | Nub On First Endcap |
| $24a_{09}$ | Interior Bore in First Endcap |
| $24b_{09}$ | Internally Threaded Exterior Bore in First Endcap |
| 25 | Second Endcap |
| $25_{Nub}$ | Nub On Second End Endcap |
| $25a_{09}$ | Interior Bore in Second Endcap |
| 30 | Mounting Bracket Assembly |
| 31 | Traveler (Sleeve) |
| 31p | Proximal Longitudinal End of Traveler |
| 31d | Distal Longitudinal End of Traveler |
| 31r | Annular Shoulder @ Proximal Longitudinal End of Traveler |
| 31s | Annular Shoulder @ Distal Longitudinal End of Traveler |
| $31_{09}$ | Longitudinal Bore Through Traveler |
| 32 | Strut |
| 32p | Proximal Transverse End of Strut |
| 32d | Distal Transverse End of Strut |
| 33 | Shelf |
| $33_{09}$ | Transverse Hole Through Shelf |
| 40 | Biasing System |
| 41 | First Biasing Member of Biasing System (First Compression Spring) |
| 42 | Second Biasing Member of Biasing System (Second Compression Spring) |
| 50 | Strap |
| 51 | Fastening System on Strap |
| 60 | Machine Screw |

-continued

| 70 | Double End Threaded Collar Stud |
| --- | --- |
| x | Longitudinal Axis |
| $x_1$ | First Longitudinal Direction |
| $x_2$ | Second Longitudinal Direction |
| y | Lateral Axis |
| z | Transverse Axis |
| xz | Median Plane |

Construction

Figure 1:
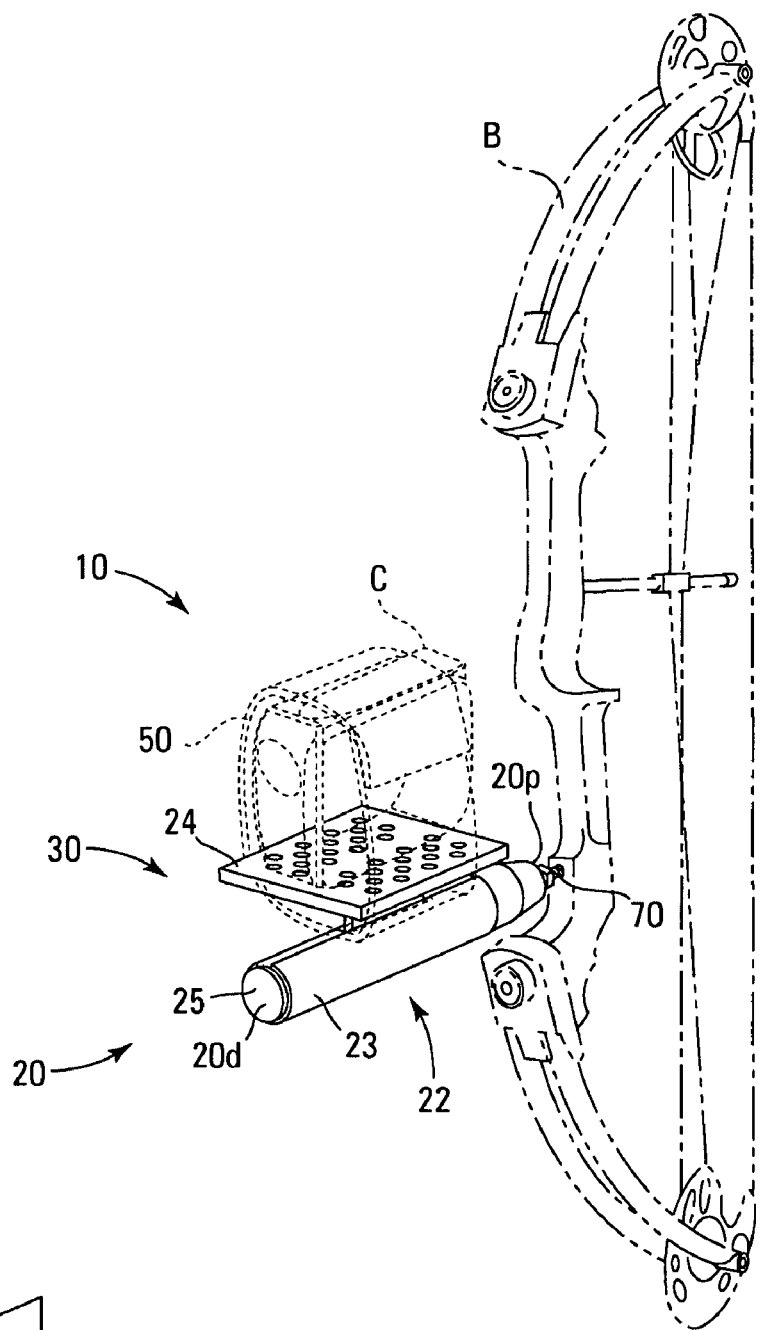
FIG. 1 is a perspective view of one embodiment of the invention.
Figure 1:
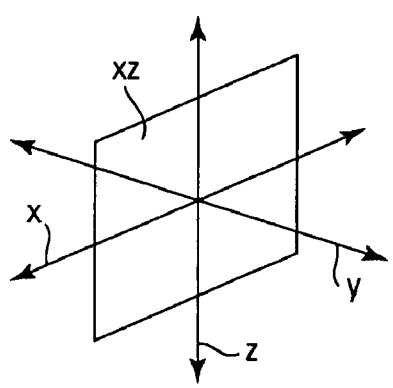
Figure 2:
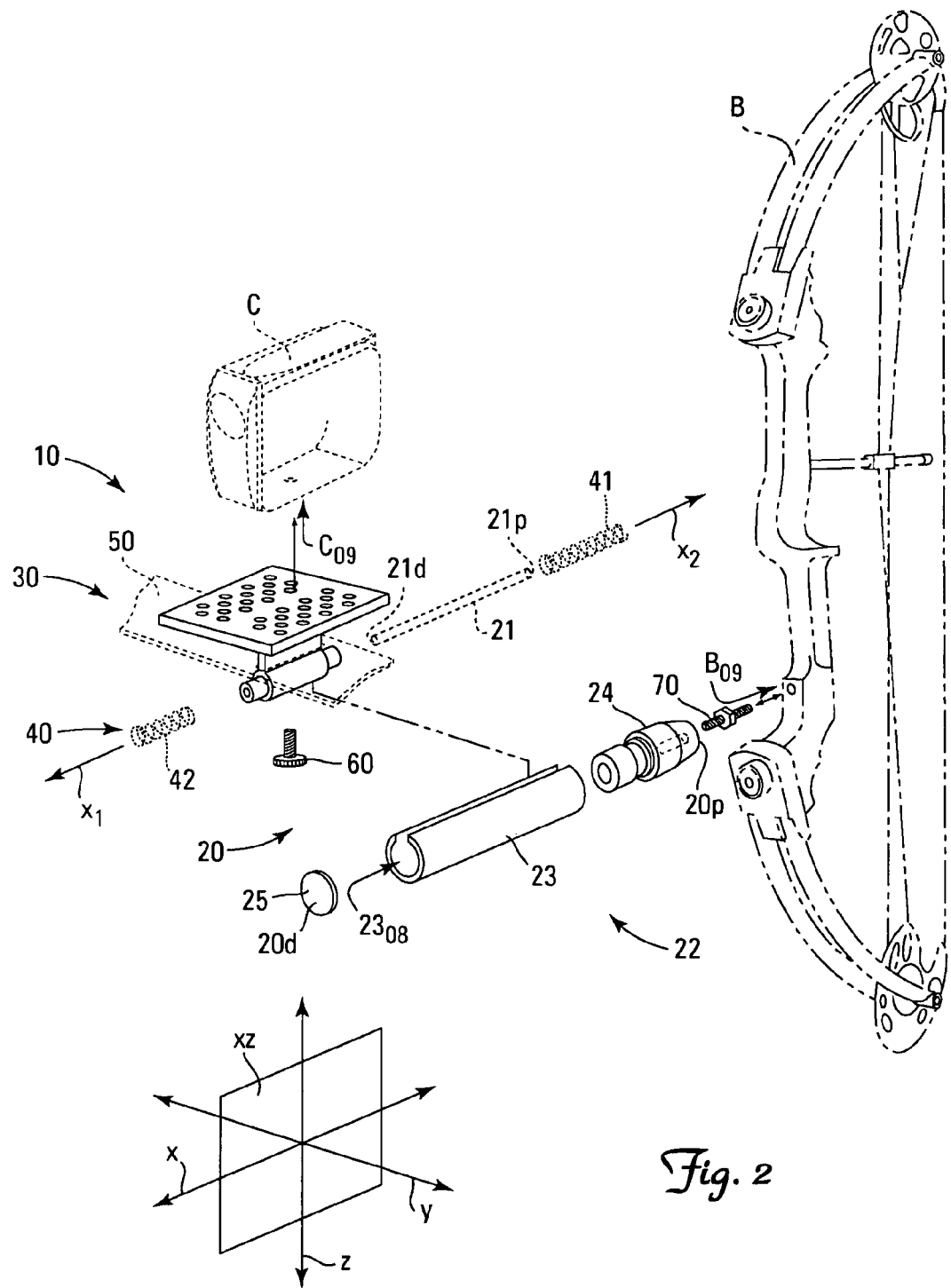
FIG. 2 is an exploded perspective view of the invention shown in FIG. 1 including phantom representations of a camera, bow and optional securement strap.

Referring to FIGS. 1 and 2, a first aspect of the invention is a device 10 for operably mounting a camera C to a bow B. The mounting device 10 includes a guideway 20, a mounting bracket assembly 30, a biasing system 40, and an attachment mechanism (not collectively numbered) for securing a camera C to the device 10.

The guideway 20 extends along a longitudinal axis x from a proximal longitudinal end 20p to a distal longitudinal end 20d. The guideway 20 serves to guide longitudinal x reciprocation of the mounting bracket 30 while limiting movement of the mounting bracket 30 in the lateral y and transverse z directions.

One embodiment of a suitable guideway 20 is depicted in FIGS. 1-7. The specific guideway 20 depicted in FIGS. 1-7 includes a center rod 21 retained within a housing unit 22. The housing unit 22 is formed from a tube 23 with a first endcap 24 secured over the proximal longitudinal end 23p of the tube 23 and a second endcap 25 secured over the distal longitudinal end 23d of the tube 23 so as to enclose the ends of the bore $23_{09}$ defined by the tube 23. A slit $23_{08}$ extends along the longitudinal x length of the tube 23 with the lateral y width of the slit $23_{08}$ sized to accommodating passage of the strut 32 on the mounting bracket assembly 30 through the slit $23_{08}$, and the longitudinal x length of the slit $23_{08}$ sized to accommodate longitudinal x reciprocation of the strut 32 along the longitudinal x length of the guideway 20.

As shown in FIGS. 5 and 6, each of the endcaps 24 and 25 has an inwardly projecting nub $24_{Nub}$ and $25_{Nub}$, respectively. An interior longitudinal x bore $24a_{09}$ and $25a_{09}$ is provided in each nub $24_{Nub}$ and $25_{Nub}$, respectively. The rod 21 is suspended along the longitudinal axis x of the channel $23_{09}$ defined by the tube 23 by insertion of the proximal longitudinal end 21p of the rod 21 into the interior longitudinal x bore $24a_{09}$ in the first endcap 24, and insertion of the distal longitudinal end 21d of the rod 21 into the interior longitudinal x bore $25a_{09}$ in the second endcap 25.

The mounting bracket assembly 30 is (i) operably attached to the guideway 20 for biased longitudinal x reciprocation of the mounting bracket 30 along the guideway 20, and (ii) configured and arranged for securely supporting a camera C with the camera C oriented so that when the device 10 is attached to a Bow B the camera C views any targets at which the bow B is pointed.

One embodiment of a suitable mounting bracket assembly 30 is depicted in FIGS. 1, 2 and 8-10. The specific mounting bracket assembly 30 depicted in FIGS. 1, 2 and 8-10 includes a traveler 31, a strut 32 and a shelf 33.

The traveler 31 defines a longitudinal x bore $31_{09}$. The guideway rod 21 extends through the bore $31_{09}$ in the traveler 31 such that the traveler 31 can slide longitudinally x along the length of the rod 21.

The strut 32 extends transversely z from a proximal transverse end 32p attached to the traveler 31 through the longitudinal x slit $23_{08}$ in the guideway tube 23.

The shelf 33 is attached to the distal transverse end 32d of the strut 32. The strut 32 preferably transversely z extends within a median plane xz defined by the shelf 33 so that the device 10 is laterally y symmetrical and balanced relative to the median plane xz defined by the device 10.

The traveler 31 is longitudinally x biased into a rest position intermediate the longitudinal ends 21p and 21d of the rod 21 by a biasing system 40. Substantially any of the well know biasing means may be employed in the present invention including specifically, but not exclusively, elastic bands, compression springs, expansion springs, leaf springs, pneumatic cylinders, etc. As shown in FIG. 2, the embodiment of the invention depicted in FIGS. 1-11 employs first and second compression springs 41 and 42 to achieve the necessary biasing. The first compression spring 41 is positioned within the longitudinal x bore $23_{09}$ of the tube 23 and compressed between the first endcap 24 at the proximal longitudinal end 23p of the tube 23 and a first annual shoulder 31r on the traveler 31 near the proximal longitudinal x end 31p of the traveler 31 for biasing the traveler 31 along the rod 21 in a first longitudinal direction $x_1$ away from the proximal longitudinal end 23p of the tube 23 and towards the distal longitudinal end 23d of the tube 23. The second compression spring 42 is positioned within the longitudinal x bore $23_{09}$ of the tube 23 and compressed between the second endcap 25 and a second annual shoulder 31s on the traveler 31 near the distal longitudinal x end 31d of the traveler 31 for biasing the traveler 31 along the rod 21 in a second longitudinal direction $x_2$ away from the distal longitudinal end 23d of the tube 23 and towards the proximal longitudinal end 23p of the tube 23. The traveler 31, and hence the entire mounting bracket assembly 30 is biased into an intermediate position between the longitudinal ends 21p and 21d of the rod 21 because the first compression spring 41 longitudinally x biases the traveler 31 against the bias of the second compression spring 42, and the second compression spring 42 longitudinally x biases the traveler 31 against the bias of the first compression spring 41.

The device 10 may be attached to a Bow B by any convenient attachment mechanism or system ranging from hook and loop tape (not shown) to a mechanical clamp (not shown). A preferred attachment mechanism, depicted in FIG. 2, is a double end threaded collar stud 70 capable of engaging the device 10 at one end (unnumbered) via an internally threaded longitudinal bore $24b_{09}$ in the first endcap 24 and engaging the bow B at the other end (unnumbered) via an internally threaded bore $B_{09}$ customarily provided in the front of a Bow B and commonly known as a stabilizer bore.

A camera C, or other electronic component such as a laser range finder (not shown) or GPS system (not shown), may be secured atop the shelf 33 by any convenient attachment mechanism or system ranging from hook and loop tape (not shown) to a mechanical clamp (not shown). A preferred attachment mechanism, depicted in FIG. 2, is a simple thumb screw 60 capable of extending from underneath the shelf 33 through a transverse hole $33_{09}$ in the shelf 33 and into threaded engagement with internally threaded bore $C_{09}$ customarily provided in the bottom (unnumbered) of cameras C and other electronic equipment for use in securing the camera C to tripods (not shown) and other similar supports.

Another suitable attachment mechanism, depicted in FIG. 2 in phantom and shown in detail in FIG. 11, is a laterally y elongated strap 50 configured and arranged for attachment to the mounting bracket assembly 30 and equipped with a releasable fastener 51 (e.g., hook and loop tape) for strapping a camera C down onto the first major surface (unnumbered) of the shelf 33.

Use

The device 10 can be used to record images of a hunt with minimal interference or impact upon the hunt. The device 10 is employed by simply, (1) attaching the device 10 to a bow B at an internally threaded stabilizer bore $B_{09}$ in the front of the bow B so that the device extends longitudinally x forward from the bow B and preferably is laterally y divided by the median plane xz defined by the bow B, (2) proceeding with efforts to locate a target (not shown), such as deer, elk or other wild game, (3) activating the camera C to start recording images as desired, with a strong preference for activation shortly after a target (not shown) has been spotted, and (4) firing an arrow (not shown) from the bow B towards the target (not shown) while the camera C is activated. No other changes, adjustments or other interaction with the camera C is required to obtain a high quality photographic or video recording of the hunt, including a recording of an target (not shown) prior to, during and immediately after firing of an arrow (not shown) from the bow B at the target (not shown).

Release of an arrow (not shown) from the bow B caused the bow B to experience a recoil effect. This recoil effect would normally effect a momentary "blinding" of the camera C at one of the most exciting moments of a hunt (i.e., the moment the target is struck by the arrow and reacts). The mounting device 10 eliminates or substantially minimizes this "blinding" effect by allowing the camera C to longitudinally x reciprocate against a bias in both longitudinal directions $x_1$ and $x_2$, thereby quickly and efficiently damping the recoil effect.

I claim:

1. A device for operably mounting a camera to a bow, comprising:
   (a) a longitudinally extending guideway defining proximal and distal longitudinal ends, with the proximal longitudinal end configured and arranged for attachment to a bow,
   (b) a mounting bracket assembly, including at least:
      (1) a traveler defining proximal and distal longitudinal ends, and operably engaging the guideway for movement along the longitudinal length of the guideway,
      (2) a transversely extending strut defining proximal and distal transverse ends, with the proximal transverse end attached to the traveler, and
      (3) a shelf attached to the distal end of the strut, whereby the shelf is transversely spaced from the traveler,
   (c) a biasing system operable for longitudinally biasing the mounting bracket assembly away from both longitudinal ends of the guideway, whereby the mounting bracket assembly is biased into a rest position intermediate the longitudinal ends of the guideway, and
   (d) an attachment mechanism for releasably securing a camera to the shelf.

2. The device of claim 1 wherein the device further includes a double end threaded stud effective for attaching the guideway to an internally threaded stabilizer bore in a bow.

3. The device of claim 1 wherein (i) the guideway includes at least (A) a longitudinally extending rod, and (B) a longitudinally extending, hollow right circular cylindrical housing defining proximal and distal longitudinal ends and concentrically surrounding the rod, with a longitudinally extending slit through the housing effective for permitting transverse passage of the strut through the slit, and (ii) the traveler slidably engages the rod for movement along the longitudinal length of the rod.

4. The device of claim 3 wherein the traveler is a sleeve.

5. The device of claim 1 wherein the strut extends from the shelf within a median plane defined by the shelf.

6. The device of claim 1 wherein the shelf has a flat first major surface facing transversely away from the strut.

7. The device of claim 3 wherein the biasing system includes (i) a first compression spring compressed between the proximal end of the housing and the proximal end of the traveler for biasing the traveler along the rod in a first longitudinal direction away from the proximal end of the housing, and (ii) a second compression spring compressed between the distal end of the housing and the distal end of the traveler for biasing the traveler along the rod in a second longitudinal direction opposite the first longitudinal direction away from the distal end of the housing, whereby (iii) the first compression spring longitudinally biases the traveler against the bias of the second compression spring, and the second compression spring longitudinally biases the traveler against the bias of the first compression spring.

8. The device of claim 6 wherein the attachment mechanism includes a laterally elongated strap attached to the mounting bracket assembly, the strap is equipped with a releasable fastener and is operable for securing a camera onto the first major surface of the shelf.

9. The device of claim 1 wherein the device includes at least one transversely extending hole through the shelf and the attachment mechanism includes a thumb screw operable for threadably engaging an internally threaded bore in a camera through the transversely extending hole through the shelf.

10. A method for recording images of a hunt, comprising the steps of:
   (a) obtaining a bow defining a median plane,
   (b) obtaining a camera,
   (c) obtaining a mounting device, comprising at least:
      (1) a longitudinally extending guideway defining proximal and distal longitudinal ends, with the proximal longitudinal end configured and arranged for attachment to the bow,
      (2) a mounting bracket assembly, including at least:
         (A) a traveler defining proximal and distal longitudinal ends, and operably engaging the guideway for movement along the longitudinal length of the guideway,
         (B) a transversely extending strut with a proximal transverse end attached to the traveler, and
         (C) a shelf attached to a distal transverse end of the strut, whereby the shelf is transversely spaced from the traveler,
      (3) a biasing system operable for longitudinally biasing the mounting bracket assembly away from both longitudinal ends of the guideway, whereby the mounting bracket assembly is biased into a rest position intermediate the longitudinal ends of the guideway, and
      (4) an attachment mechanism for releasably securing the camera to the shelf,
   (d) attaching the mounting device to the bow via an internally threaded stabilizer bore in the front of the bow, wherein the mounting device extends longitudinally forward from the bow and is laterally divided by the median plane defined by the bow,
   (e) activating the camera to start recording images, and
   (f) firing an arrow from the bow towards a target while the camera is activated.

11. The method of claim 10 wherein the camera is a video camera.

12. The method of claim 10 wherein the target is wild game.

13. The method of claim 10 wherein the mounting device is attached to the bow by a double end threaded stud.

14. The method of claim 10 wherein (i) the guideway includes at least (A) a longitudinally extending rod, and (B) a longitudinally extending, hollow right circular cylindrical housing defining proximal and distal longitudinal ends and concentrically surrounding the rod, with a longitudinally extending slit through the housing configured and arranged for permitting transverse passage of the strut through the slit, and (ii) the traveler slidably rides along the longitudinal length of the rod.

15. The method of claim 14 wherein the traveler is a sleeve.

16. The method of claim 10 wherein the strut extends from the shelf within a median plane defined by the shelf.

17. The method of claim 10 wherein the shelf has a flat first major surface facing transversely away from the strut.

18. The method of claim 10 wherein the biasing system includes (i) a first compression spring compressed between the proximal end of the housing and the proximal end of the traveler for biasing the traveler along the rod in a first longitudinal direction towards the distal end of the housing, and (ii) a second compression spring compressed between the distal end of the housing and the distal end of the traveler for biasing the traveler along the rod in a second longitudinal direction opposite the first longitudinal direction towards the proximal end of the housing, whereby (iii) the first compression spring longitudinally biases the traveler against the bias of the second compression spring, and the second compression spring longitudinally biases the traveler against the bias of the first compression spring.

19. The method of claim 17 wherein the camera is secured to the first major surface of the shelf by a laterally elongated strap attached to the mounting bracket and equipped with a releasable fastener.

20. The method of claim 10 wherein the camera is secured to the shelf by a thumb screw transversely extending through a hole in the shelf and threadably engaging an internally threaded bore in the camera.

\* \* \* \* \*